United States Patent [19]
Hahn

[11] Patent Number: 5,228,255
[45] Date of Patent: Jul. 20, 1993

[54] METHOD AND APPARATUS FOR IMPROVED BELT TYPE EXPANSION JOINTS

[75] Inventor: Robert B. Hahn, Virginia Beach, Va.

[73] Assignee: The Atlantic Group, Inc., Norfolk, Va.

[21] Appl. No.: 874,708

[22] Filed: Apr. 28, 1992

[51] Int. Cl.⁵ .............................................. E04B 1/62
[52] U.S. Cl. ....................... 52/396; 52/573; 404/65; 404/69; 277/72 FM
[58] Field of Search ........... 52/573, 396; 277/72 FM, 277/79; 285/373; 404/65, 68, 69

[56] References Cited

U.S. PATENT DOCUMENTS

| | | |
|---|---|---|
| 2,232,936 | 2/1941 | Bimpson . |
| 2,404,447 | 7/1946 | Marancik et al. . |
| 2,413,308 | 12/1946 | Arnold . |
| 2,592,372 | 4/1952 | Altorfer . |
| 3,183,022 | 5/1965 | Sayag . |
| 3,186,742 | 6/1965 | Frankel et al. . |
| 3,400,952 | 9/1968 | Swenson et al. . |
| 3,430,645 | 3/1969 | Stalph . |
| 3,445,393 | 5/1969 | Hinds . |
| 3,907,442 | 9/1975 | Reid . |
| 4,050,700 | 9/1977 | Lifferth . |
| 4,063,755 | 12/1977 | Merz . |
| 4,203,607 | 5/1980 | Brieger . |
| 4,289,338 | 9/1981 | Cook . |
| 4,305,680 | 12/1981 | Ranchfuss, Jr. ................... 404/69 |
| 4,548,429 | 10/1985 | Merz . |
| 4,732,413 | 3/1988 | Bachmann et al. . |
| 4,848,803 | 7/1989 | Bachmann . |
| 4,913,576 | 4/1990 | Grant, Jr. . |

*Primary Examiner*—Carl D. Friedman
*Assistant Examiner*—Kien Nguyen
*Attorney, Agent, or Firm*—Fitzpatrick, Cella, Harper & Scinto

[57] ABSTRACT

A method and apparatus for defining an expansion joint seal with a belt comprising a body portion elongated in the longitudinal direction and having a first edge bead at one end and a second edge bead at the other end. A first edge bead is inserted within a larger diameter first cylindrical cavity elongated in the transverse direction and defined by inner and outer recesses between a first clamp bar and a first clamping surface. A second edge bead then is inserted within a larger diameter second cylindrical cavity, also elongated in the transverse direction and defined by a second clamp bar and a second clamping surface. Each clamp bar then is fastened to locate a bead edge loosely within a surrounding cavity. Finally, a sealant material is injected under pressure into each cavity, so as to surround the edge bead loosely positioned therein, and thereby create a tight seal.

8 Claims, 1 Drawing Sheet

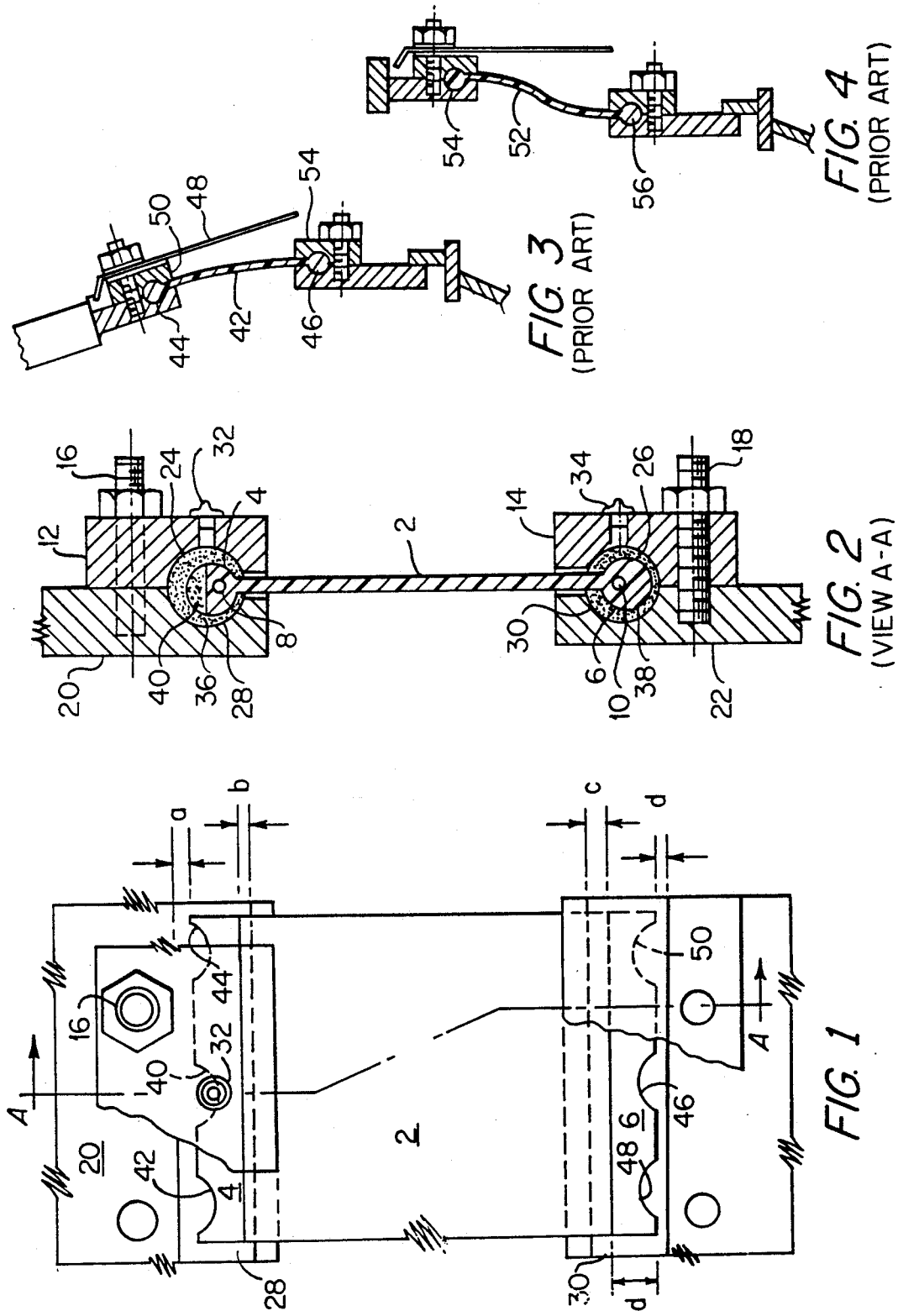

METHOD AND APPARATUS FOR IMPROVED BELT TYPE EXPANSION JOINTS

BACKGROUND OF THE INVENTION

1. Field of Invention

A method and apparatus for improving the flexible connection between low pressure turbines and condensers, and the like, involving a modified belt type expansion joint and an in situ fluid sealant.

2. Brief Description of the Prior Art

The belt type expansion joint commonly is used as the flexible connection between low pressure turbines and steam condensers in power plants, both fossil and nuclear. The belt itself is shaped like a dog bone, with a longitudinal central section and a bead edge at either end. Such an expansion joint typically can accommodate up to one inch of longitudinal compression travel between wall sections, and a half inch of lateral deflection. However, it is well-known that a dog bone belt cannot accommodate any longitudinal extension travel, after being mounted. Hence, it has been a critical design criteria to tightly control the longitudinal spacing between two clamping bar assemblies so as to remain within the belt manufacturer's specifications for a given belt type expansion joint.

Such belts have long been designed and manufactured by La Favorite Industries, Hawthorne, N.J. The belt typically comprises a composite of tire cording and vulcanized rubber with a first edge bead and a second edge bead. The belts typically are sized in increments between 6-10 inches in overall height, have a central portion between ⅜ and ⅝ inches thick, and include cylindrical bead edges that typically are standardized at about 1.250" inches in diameter, both at the top and at the bottom.

The removable clamping bar, as well as the clamping surface fixed to a condenser or turbine wall structure, also typically cooperate to define a cylindrical cavity with an inner diameter of about 1.125 inches. That cavity between the clamping bar and the wall clamping surface is intended to tightly engage the edge bead, when the clamp is fastened. However, as noted before, there is a critical longitudinal dimension between the first cavity and the second cavity, and this dimension cannot initially be smaller than the corresponding dimension between the two edge beads of an inserted dog bone. Accordingly, there always is a zero plus tolerance for the expansion joint height, with respect to the height of the dog bone, and up to a ½ inch minus tolerance.

The clamping surface which becomes part of a condenser or turbine wall structure must be field welded in place, and often times that clamping recess will be at an improper angle or otherwise will shift after installation. Furthermore, years of thermal cycling in the power plant, or settling of plant and equipment, can shift or move either the turbine or the condenser. Hence, that critical dimension can easily be altered from a design point. Since the dog bone belt cannot accommodate any extension beyond its design height, power plants typically have to perform expensive modifications, where an unacceptable misalignment situation arises.

Accordingly, to replace such an expansion joint, the entire circumference served by the expansion joint must carefully be field-measured and a replacement dog bone selected that will be within the design tolerances. A dog bone typically is designed to accept a maximum one inch in cyclical axial compression, due to thermal expansion and contraction effects. However, it should be appreciated that if there is an initial misalignment during installation of the clamping bars, the desired one inch compression range seriously will be impaired. If the dog bone has an installed bow (because the clamping bars are too close together) that initial bow will tend to cause premature failure of the rubber and cording, due to excessive flexure. If the dog bone is installed too tightly, as by a transverse misalignment greater than the design misalignment permitted, the shoulder of each clamp will make a line contact with the bead, leaving inadequate sealing contact between the bead edge and its surrounding cavity. With less than a full circular surface seal, significant leakage of air into the condenser structure will occur, and the mixing of air with steam seriously degrades condenser performance.

MERZ (U.S. Pat. No. 4,063,755) illustrates another compensator or expansion joint wherein a planar belt is bolted outside of a sealing cavity filled with flexible fabrics and thermally sensitive materials, so as to protect the outwardly mounted rubber belt. In this solution a different mounting is required, and an existing dog bone cannot be replaced with such a seal.

It also generally is known that a fluid elastomeric material may have value as a sealant, in a space between parts subject to relative movement forces. LIFFERTH (U.S. Pat. No. 4,050,700) illustrates injection of a fluid sealant under pressure through a Zirk type fitting, into a void between two metal parts. BRIEGER (U.S. Pat. No. 4,203,607) illustrates an elastomeric packing comprising a large size grit to minimize extrusion of an O-ring into a clearance space. Likewise, HINDS (U.S. Pat. No. 3,445,393) discusses how various large, flake-like copolymer materials have utility as a packing material, where there is a potential of escape through a clearance space.

BRIEF SUMMARY OF INVENTION

The present invention comprises a method and an apparatus wherein a dog bone style belt has at least one edge bead deliberately undersized with respect to the cavity conventionally provided within a clamp bar assembly. A belt type expansion joint very commonly is used as the flexible connection between a low pressure steam turbine and the condenser in electric power generating stations. The present invention significantly is adaptable to field conditions in power plants as they presently exist, and otherwise could not easily be accommodated by a standard dog bone, having a typical cross-section. The cylindrical cavity defined by a typical clamping bar is about 1.125 inches in diameter, and the present invention does not require modification of the cavity configuration. The present invention only requires drilling a small inlet into the clamp bar for injecting sealant material, and typically a Zirk type fitting or other check valve type of inlet would be tapped into the drilled hole. Preferably a small pilot hole drilled transversely into the face of the clamping bar, in alignment with a diameter of the cavity.

Preferred sealing materials include silicon rubber, heat and chemical resistant fluoro-elastomers such as Viton, and rubber-like synthetic elastomers involving sulfo-chlorinated polyethylene (CSN) such as Hypalon. Also, it is preferred that the sealant have a granular quality, in order to prevent unnecessary extrusion or flow of the sealant fluid into a clearance space between the clamping bar and the clamping surface, after they have been bolted together.

The dimension of the edge bead on a dog bone belt according to the present invention preferably is reduced from 1.250" inches to between approximately 0.750 inches and 0.875 inches. Furthermore, the overall height of a dog bone belt according to the present invention preferably will be less than the overall length of a dog bone belt being removed in a replacement situation. Because the edge bead diameter is significantly reduced, the top to bottom overall dimension also is reduced, for belts otherwise having the same longitudinal central portion length. The present method and apparatus preferably achieves approximately one inch of "play" between the clamping bars, before the clamping bars are tightened.

After the belt is located centrally between the clamp bars, the clamp bars are tightened, before introducing the elastomeric sealant. The sealant preferably is fluid and silicon-based, and injected under pressure through a Zirk type fitting, so as to completely fill a continuous void around the bead edge. In order to ensure flow of sealant fluid completely around both edge beads, each edge bead also preferably has a gating modification in an outer surface. The preferred gating modification is to mold a plurality of spaced cut-outs along the uppermost edges of both top and bottom edge beads. The cut outs define a gate or path for high-pressure sealant to flow completely around the cylindrical surface of an edge bead and fill all voids existing between the bead edge and a surrounding cavity.

Accordingly, a first object of the present invention is to provide a method for replacing belt type expansion joints in the field, that achieves an improved seal between the edge bead and a clamping bar.

A second object of the present invention is to provide a belt type expansion joint and associated clamp bar apparatus that will permit easy field installations, wherein an initial positioning of the joint in the pair of clamps will not delimit the amount of travel for which the expansion joint was designed.

A third object of the present invention is to provide a belt type expansion joint having cut outs molded along the bead edge, so as to provide a gate for a high-pressure sealant to completely fill a void space between the bead edge and a surrounding cavity.

For a further understanding of these and other objects and advantages of the present invention, a preferred embodiment hereafter is described with reference to the accompanying drawings.

BRIEF DESCRIPTION OF THE DRAWINGS

FIG. 1 is a front elevation view, in partial section, showing a belt type expansion joint and associated clamp bars, embodying the present invention;

FIG. 2 is side elevation view, in section, taken along line AA of FIG. 1;

FIG. 3 is a side elevation view, in section, showing a prior art belt type expansion joint and a first misalignment situation;

FIG. 4 is a side elevation view, in section, showing a prior art belt type expansion joint and a second misalignment situation.

DETAILED DESCRIPTION OF A PREFERRED EMBODIMENT

FIG. 1 is a front elevation view, partial section, showing those structural elements which are modified so as to define the present invention.

The novel dog bone belt 2 conventionally is constructed of vulcanized rubber with cord reinforcement in the fashion of an automobile tire. A first edge bead 4, and a second edge bead 6, typically are formed around inner cores 8, 10 that may be made of cord or an elastomer to add dimensional stability and strength to the expansion joint. The first edge bead, 4, is significantly smaller than the edge bead on a standard condenser/lower pressure turbine dog bone belt. As shown in FIG. 1, there is an amount of play illustrated by the dimensions a, b around the first edge bead 4, and a second amount of play, represented by the dimensions, c, d, around the second edge bead, 6. The combined dimension a+b, represents the longitudinal diameter decrease between the first concave clamp recess 24 and the diameter of the first edge bead, 4. The first concave wall recess 28, cooperates with the clamp bar recess 24 to define a conventional cylindrical cavity approximately 1.250" inches in diameter. It should be appreciated that each of the dimensions a, b may be up to 0.375 inches. Likewise, with respect to the second edge bead, 6, the amount of play resulting from the smaller size of second edge bead, 6 and the cavity diameter defined by a second clamp bar recess, 26, and an associated second concave wall recess, 30, is represented by the combined dimension c+d. The longitudinal distance between centerlines of first inner core 8, and second inner core 10 preferably is equivalent to the on center dimension between the cavities defined by the first and second clamp bars 12, 14. If that situation exists, the dimension a should be set to equal dimension b and, likewise, dimension c should be set to equal dimension d. As noted hereinbefore, a belt type expansion joint cannot withstand any amount of longitudinal extension. Hence, a critical dimension for purposes of FIG. 1 is the amount of play defined by the combination of the dimensions b and c. It is preferred that b and c together approximate 1.0 inches, and that b and c are set to be relatively equal, before clamping down the first and second clamp bars 12, 14 over the undersized first and second edge beads 4, 6. Studs with bolts 16, 18 typically are used to hold a clamp bar, and work without modification in the present invention.

A first one in a set of Zirk fittings 32 is shown drilled directly on a diameter of the first clamp concave recess 24, in order to introduce elastomeric material into the annular space surrounding the first edge bead 4 and throughout the void remaining in the cavity defined by recesses 24, 28. Likewise, a first one of a second set of Zirk fittings 34, is shown drilled along a diameter of the second clamp concave recess, 26, so as to introduce an elastomeric material.

The cross-sectional view of FIG. 2, taken along section line A—A of FIG. 1, further illustrates a preferred form of gate modification to a bead edge. Semicircular cut-outs are spaced at transverse locations along both the first edge bead and the second edge bead. Around the first edge bead, injected sealant 36, first fills the void formed as a gate by a cut-out 40, since cut-out 40 is aligned close to the axial bore for the Zirk fitting 32. The additional cut-outs 42, 44 illustrate an additional gating function, that is facilitated away from the injection point. Accordingly, around the first edge bead 4, there is a significant in situ transverse locking effect as the sealant fills the cut-outs 40, 42, 44, and also fills the void space surrounding the first edge bead 4. In this fashion an annular or circular surrounding seal is achieved with respect to the first clamp bar 12, and the first condenser wall clamping surface 20. Likewise, FIG. 2 shows how a portion of the second bead edge will be surrounded at the section A-A, as a consequence of high-pressure injection of sealant through the Zirk fitting 34, into the cavity as defined by the recesses, 26, 30.

FIGS. 3 and 4 illustrate, in sectional side views, serious misalignment field conditions with existing prior art belt-type expansion joints. The present invention is particularly useful for easily resolving such problems. In FIG. 3, a conventional dog bone 42, with a first edge bead 44, and a second edge bead 46, is in a condition likely to cause a poor seal between each of the bead edges and its surrounding clamping bar. A FIG. 3 misalignment is likely to cause only a line contact between the clamp bar 50 and the first edge bead 44, making it likely that air will enter into the interior of the fluid flow path, to mix with steam, which is flowing at high velocity just inside the conventional metal liner, 48. Such a liner is conventionally required, but has been left out from FIGS. 1 and 2 for clarity.

FIG. 4 illustrates a second form of misalignment wherein a conventional dog bone 52, with a first edge bead 54 and a second edge bead 56, is in a bow condition due to an excess transverse displacement. Such an initial bow, when coupled with normal thermal cycling, tends to cause premature failure of the belt in the vicinity of greatest flexure of the belt central portion; typically near the midpoint of belt 52.

The prior art problem situations represented by FIGS. 3 and 4 are addressed by the present invention. The structure shown in FIGS. 1 and 2 allows the installer to establish an optimum location of the first and second edge beads 4, 6, with respect to the cavities defined by the first and second clamp bars 12, 14 because the bead edges permit about one inch of longitudinal play, before and after tightening a clamp bar. In situations as illustrated by FIGS. 3 and 4, the installer easily can ensure that the dimensions b, c (as illustrated in FIG.) approximately are equal and no prestress will tend to stretch the belt. As noted hereinbefore, design parameters for all belt type expansion joints require dimensions b and c to be positive, and never negative.

Although the preceding embodiment addresses a situation where the belt type expansion joint is used to provide differential expansion between a low-pressure turbine and a condenser, the principles of the present invention equally are applicable wherever a dog bone type expansion joint would be useful.

Those skilled in the art will recognize further additions and modifications that can be made to the invention without departing from the spirit of the invention. Accordingly, the invention is to be defined by the scope of the appended claims.

I claim:

1. A belt type expansion joint apparatus for use between wall surfaces subject to longitudinal expansion and contraction, said apparatus comprising in combination:

a belt comprising a body portion that is elongated in the longitudinal direction and having a first edge bead at one end and a second edge bead at the other end;

a first clamp bar and means for mounting said clamp bar to a first clamping surface connected to a first wall section, said first clamp bar having an inner recess and said first clamping surface having an outer recess, whereby a first cylindrical cavity elongated in the transverse direction will be defined by said inner and outer recesses when said first clamp bar is mounted upon said first clamping surface;

a second clamp bar and means for mounting said clamp bar to a second clamping surface connected to a second wall section, said second clamp bar having an inner recess and said second clamping surface having an outer recess, whereby a second cylindrical cavity elongated in the transverse direction will be defined by said inner and outer recesses when said second clamp bar is mounted upon said second clamping surface;

wherein at least one of the edge beads has an outer diameter that is smaller than the inner diameter of a cylindrical cavity into which that edge bead may be clamped by a clamp bar through said mounting means, and said clamp bar further comprises a means to inject a sealant into that cylindrical cavity and around said edge bead.

2. A belt type expansion joint apparatus according to claim 1, wherein said first and second clamp bars each have a means to inject a sealant into a cylindrical cavity defined with an associated clamping surface and around said edge bead.

3. A belt type expansion joint apparatus according to claim 1, wherein said edge bead that is smaller in diameter further comprises at least one cut-out on an outer surface thereof, whereby sealant injected into any surrounding cylindrical cavity will pass through said cut out.

4. A belt type expansion joint apparatus according to claim 3, wherein said belt has a longitudinal plane of symmetry, each of said edge beads has a diameter smaller than that of a cylindrical cavity and each edge bead has a plurality of cut outs that transversely are spaced along an outer surfaces of that bead and longitudinally are aligned with said longitudinal plane of symmetry.

5. A belt type expansion joint apparatus according to claim 1, wherein said belt has a longitudinal plane of symmetry, each of said edge beads has a diameter smaller than that of a cylindrical cavity, and said means to inject a sealant into a cylindrical cavity further comprises a high pressure fitting through a wall portion of the clamp bar that substantially is aligned with a diameter of said cylindrical cavity.

6. A method for defining an expansion joint seal with a belt comprising a body portion elongated in the longitudinal direction and having a first edge bead at one end and a second edge bead at the other end, said method comprising the steps of:

A. inserting said first edge bead within a first cylindrical cavity elongated in the transverse direction and defined by inner and outer recesses between a first clamp bar and a first clamping surface;

B. inserting said second edge bead within a second cylindrical cavity elongated in the transverse direction and defined by inner and outer recesses between a second clamp bar and a second clamping surface;

C. fastening each of said clamp bars upon the associated clamping surface so as to locate each bead edge loosely within a surrounding cavity;

D. injecting a sealant material under pressure into each of said cavities, so as to surround the edge bead that loosely was positioned in each cavity, and thereby tightly seal each edge bead within a surrounding cavity.

7. A method for defining an expansion joint seal according to claim 6, wherein at least one of said edge beads has a diameter less than a surrounding cavity, said bead edge is cylindrical with at least one cut out or an outer surface thereof, and said bead edge is located so as to be substantially concentric within a surrounding cavity in said fastening step.

8. A method for defining an expansion joint seal according to claim 6, wherein said injecting step further comprises introducing an elastomeric fluid material through a wall portion of a clamp bar so that the fluid material enters a cylindrical cavity substantially along a diameter thereof.

* * * * *